Nov. 3, 1931.   H. A. NEWCOMB   1,830,127
FASTENING DEVICE
Filed May 8, 1929
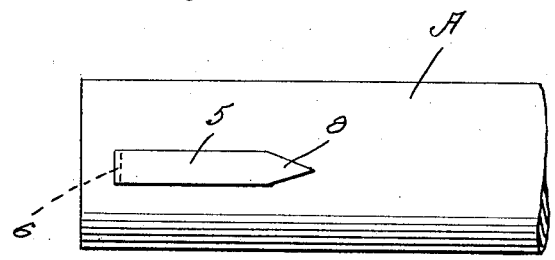
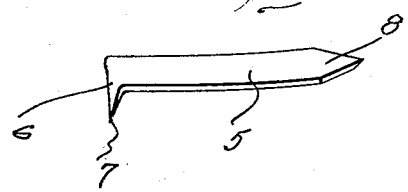
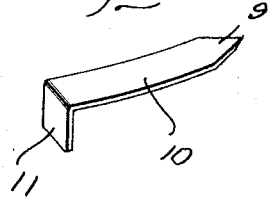
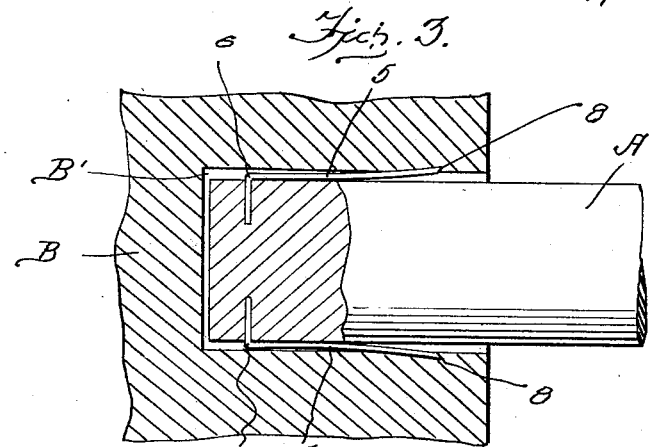
Inventor
Howard A. Newcomb
By Clarence A. O'Brien
Attorney Patented Nov. 3, 1931

1,830,127

UNITED STATES PATENT OFFICE

HOWARD A. NEWCOMB, OF DURHAM, NORTH CAROLINA, ASSIGNOR TO AUTOMATIC DOWEL LOCK CORPORATION, A CORPORATION OF NORTH CAROLINA

FASTENING DEVICE

Application filed May 8, 1929. Serial No. 361,525.

This invention relates to a fastening device and more particularly to a fastening device for use in connection with the tenon and mortise joint of furniture, boxes, cabinets, wagons, wheel spokes, and all other such forms of wood work where two pieces of wood are to be joined together by a dowel or mortise.

The primary object of the invention is therefore to provide a fastening device for the purpose above mentioned which will be of novel and simple construction and which will be found fully capable of securing the parts of a tenon and mortise joint together in a very capable and efficient and reliable manner.

Other objects and advantages of the invention will become apparent from a study of the following description, taken in connection with the accompanying drawings, wherein:

Figure 1 is a perspective view of the fastener applied to a tenon previous to driving the same in the socket.

Figure 2 is a perspective view of one form of my improved fastener.

Figure 3 is a sectional view through a joint having the fastener applied thereto.

Figure 4 is a perspective view of another form of fastener.

Figure 5 is a perspective view of still another form of fastener, and

Figure 6 is another modified form of fastener.

In general, the present fastening device comprises a metal blank capable of being interposed between the tenon member and the mortise member of a tenon mortise joint. The fastening device is preferably formed of a small spring steel of varying length and width, one end of which is to be bent at an angle of about ninety degrees to the long member of the dowel and sharpened in the form of a tack for the purpose of driving the fastener into a tenon or other male member of a mortise joint. The other end of the fastener is curved slightly outwardly from the surface of the dowel pin or male member of the mortise, this end of the fastener being sharpened from the underside leaving that end of the fastener with a knife like edge adapted to pierce the top and bottom walls of a mortise or socket.

That embodiment of the invention shown in Fig. 2 consists of a spring metal blank comprising an elongated tongue 5 and a relatively short and comparatively rigid heel 6. The heel may be pointed at its end 7 to adapt it to be driven into the wood of a dowel or tenon A. The tongue 5 is preferably rather narrow and its inner face is smooth and free of any projections which would interfere with the tendency of the tongue to spring outwardly throughout its length and from its point of attachment with the heel. The free end of the tongue is preferably pointed or otherwise suitably sharpened to adapt it to enter the side walls of the socket or mortise B' formed in the part B, to resist any tendency of the tenon to move out of the socket.

The fastener as shown in Figure 6 preferably consists of an elongated metal blank, one end of which is provided with a pointed extremity 9, which pointed extremity is bent upwardly so as to pierce the walls of a mortise or socket in the same manner as the pointed extremity 8 of the first mentioned fastener and the opposite end of this blank 10 is bent downwardly to provide the flange 11 which flange is adapted to be embedded into the tenon A.

In the embodiment of the invention as shown in Figure 4, I employ a relatively rectangular plate 12, bent downwardly along one edge as at 13, to provide a serrated flange 14 constituting the teeth 15 extending at right angles to the plate. The opposite edge of the plate 12 is serrated as at 16, to provide the teeth 17. It is also to be noted that the serrated end 16 of the plate is bent upwardly so that the teeth 17 may pierce the walls of the socket in the same manner as the pointed extremity of the hereinbefore described fastening devices.

As shown in Figure 5, the fastening device may consist of an elongated plate 18, having an aperture 19 formed adjacent one end thereof and the opposite end terminating in a pointed extremity 20, which pointed extremity 20 is also bent upwardly and it will be seen that in using this device, a nail or other fastening means may be driven through the aperture 19 for securing the fastener to the tenon A and the pointed extremity of the fastener will pierce the walls of the tenon or socket.

In applying either of the fasteners, it is merely necessary to place the plate portion of the fastener against the tenon and the downwardly projecting end of the fastener is then driven into the tenon as shown in Figure 3. The tenon A may then be driven into the sockets B' of the member B. When the fastener is so applied and the male and female members joined as shown in Figure 3, the pointed extremities of the fastener being bent upwardly extend away from the tenon A and pierce the walls of the socket as clearly illustrated. Thus it will be seen that the members A and B are held in secured assembly since it is apparent that any tendency of the tenon A to withdraw from the socket would only cause further penetration of the pointed extremities of the fastener within the walls of the socket.

The fastener when constructed as illustrated in Figure 6 will be found most adaptable when the male member of the mortise is metal and the female member wood. When this type of fastener is used, it is necessary to file a groove in the metal male member as would be apparent.

In view of the apparent simplicity of the device, a more detailed description thereof is believed unnecessary.

Even though I have herein shown and described certain detail features and embodiments of my invention, it it to be understood that the same is susceptible of certain changes not shown or illustrated, but fully comprehended by the spirit of the invention as herein described and the scope of the appended claims.

What is claimed is:

1. A tenon clip of the character described stamped from sheet metal and consisting of an elongated pointed tongue and an inturned relatively short and rigid heel portion disposed substantially at right angles to the tongue at their point of juncture and adapted to be driven into a tenon that is to be locked in a socket, said tongue portion being resilient throughout its length and tending to spring away from the tenon to which it is applied throughout its length, whereby when said clip is driven into a tenon with its heel toward the end of the tenon and its pointed end toward the outer end of the socket said pointed end is caused to engage and enter the material forming the wall of the socket.

2. In combination with a socket and tenon structure, a tenon clip consisting of a sheet metal stamping disposed as a whole upon a single face of the tenon and comprising an elongated spring tongue and a relatively short and rigid heel projecting substantially at right angles from one end of the tongue and having its free end shaped to adapt it to be forced into the wood of the tenon, said spring tongue having a relatively sharp outer end adapted to engage the wall of the socket, said spring tongue tending to spring outwardly from its point of attachment with the heel, said heel being disposed toward the end of the tenon and the free end of the tongue being directed toward the outer end of the socket.

3. A structure as recited in claim 2 wherein a plurality of independent tenon clips of the character described are disposed at a plurality of points about the tenon and center the tenon in the socket.

4. A structure as recited in claim 1 wherein the said tongue is smooth and free of projections along both of its sides and upon its inner face.

In testimony whereof I affix my signature.

HOWARD A. NEWCOMB.